Patented May 20, 1941

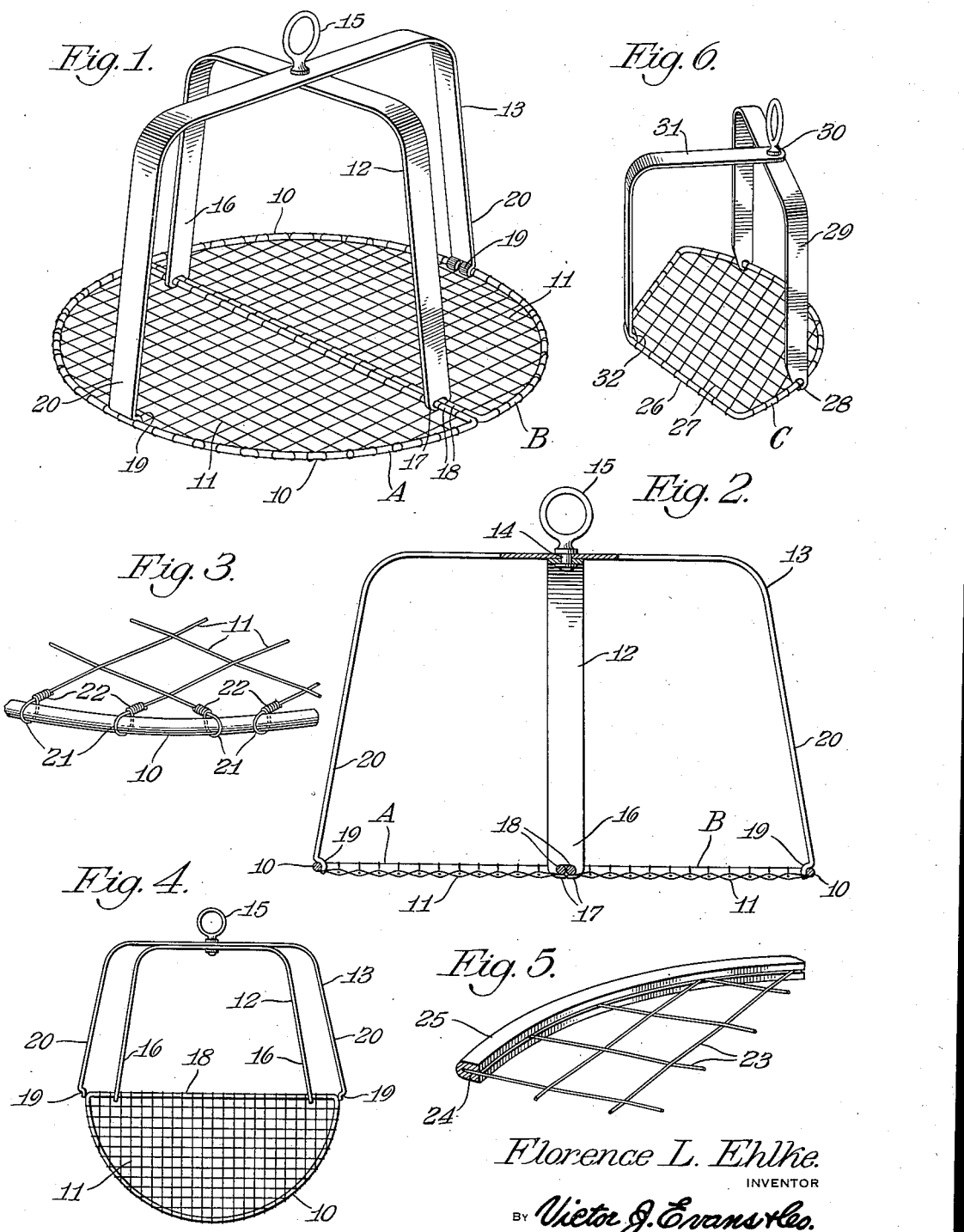

2,242,607

UNITED STATES PATENT OFFICE 2,242,607

VEGETABLE DICER

Florence L. Ehlke, North Muskegon, Mich.

Application December 19, 1939, Serial No. 310,066

5 Claims. (Cl. 146—129)

The invention relates to a vegetable cutter or slicer and more especially to that type known as vegetable dicers.

The primary object of the invention is the provision of a device of this character for household and restaurant use, wherein whole cooked vegetables may be cut into strips and cooked sliced vegetables may be cut into cubes without removing the same from the cooking utensil wherein they have been cooked, the cutting being done by pressing through the vegetables a crosswork of fine but strong wires, which are tightly strung upon a rigid frame for the exact shape and size to fit precisely into the various standard sizes of straightsided cooking utensils and of a kind that will facilitate the easy withdrawal of the device after the cutting operation is completed without lifting of the severed vegetables from the receptacle.

Another object of the invention is the provision of a device of this character, which is susceptible of being folded to enable the easy and convenient removal from a receptacle or other cooking utensil after completing the cutting operation and also when such device is not in use in that it can be stored conveniently in a drawer, compartment or the like without occupying excessive space.

A further object of the invention is the provision of a device of this character wherein vegetables such as carrots, beets, turnips, parsnips, egg plant, potatoes or the like can be conveniently and with dispatch cut into strips, sliced into cubes or otherwise severed when contained within a holder, for example, a cooking utensil, and after the cooking period, the device being of novel construction so that it can be readily introduced into and removed from the holder for the vegetables without liability of waste or disturbing the cooking period for the cooking of said vegetables.

A still further object of the invention is the provision of a device of this character, which is simple in construction, thoroughly reliable and efficient in operation, convenient for easy handling, possessed of few parts, strong, durable, and inexpensive to manufacture.

With these and other objects in view, the invention consists in the features of construction, combination and arrangement of parts as will be hereinafter more fully described in detail, illustrated in the accompanying drawing, which discloses the preferred and modified forms of embodiment of the invention and pointed out in the claims hereunto appended.

In the accompanying drawing:

Figure 1 is a perspective view of a device constructed in accordance with the invention and set up for use.

Figure 2 is a vertical sectional view thereof.

Figure 3 is a fragmentary perspective view of one of the cutting units of the device.

Figure 4 is a side elevation of the device in a folded condition.

Figure 5 is a view similar to Figure 3 showing a slight modification.

Figure 6 is a perspective view of a further modification of the device.

Similar reference characters indicate corresponding parts throughout the several views in the drawing.

Referring to the drawing in detail, particularly Figures 1 to 4, inclusive, the device constituting the present invention comprises preferably a pair of segmental-shaped units A and B, respectively, each formed from a frame 10 made from a length of wire inherently stiff and strung with cross wires 11, these being at right angles to each other and are spaced the required distance apart from one another to function as cutters for the cutting of vegetables or the like after a cooking period thereof as will be hereinafter described.

The units A and B are hinged in matched relation to each other and are supported in this manner by one of a pair of crossed foldable bails 12 and 13, respectively, each of substantially inverted U shape and at the crossing point between the pair are pivotally connected by a stud 14 of an eye member 15, the crossing point being centered relative to the said bails. The bail 12 has the ends 16 thereof clenched at 17 about the straight meeting stretches 18 of the frames 10 of the units A and B so that these can swing away from each other in an arcuate course to lie in the same plane with each other or on reverse swing to align with the bail 12. These adjusted positions of the units A and B are shown in Figures 1, 2 and 4 of the drawing.

The bail 13 is swingable relative to the bail 12 so as to fold into alignment therewith or to swing at right angles thereto and in this latter position the latching ends 19 of said bail 13 can be snapped into engagement with the frames 10 when in the same plane with each other of the units A and B for the latching of the latter in this position. The side limbs 20 of the bail 13 are inherently springy for effecting the latching engagement at 19 thereof with the frames 10 of the units A and B. On unlatching the limbs 20, these units A and B swing downwardly side by side in alignment with the bail 12. When the device is brought into use for slicing or cutting operation, the frames 10 of the units A and B are aligned or in the same plane with each other and latched by the bail 13. Therefore, when introducing the device in this condition into a receptacle, pan or the like and pressing downwardly upon said device, the wires 11 will sever or cut the cooked vegetables or the like as within the receptacle, pan or similar utensil into cubes or strips. Now to eliminate the possibility of the lifting of the contents from the receptacle, pan or similar utensil by the units A and B after the cutting operation is completed, the units A and B are released from the bail 13 permitting the same to drop down side by side against each other in alignment with the bail 12, this taking place on the removal of the device from the receptacle, pan or similar utensil without the lifting of the vegetables therefrom and avoiding waste thereof.

The units A and B when in the same plane with each other complete a true circular conformation and the device of such conformation as created by the units A and B is adaptable for manipulation in receptacles, pans or other utensils of the round or circular type of corresponding size.

The wires 11 are looped at 21 about the frame 10 and terminally twisted at 22 for the fastening of said wires to the frame.

In Figure 5 of the drawing the wires 23, which are the equivalent of the wires 11, are tacked into a crease or groove 24 provided in the frame part 25 of a foldable unit of the device and such wires 23 pinch in the crease or groove for the fastening thereof in place in the frame.

In Figure 6 of the drawing there is shown a modification of a unit C of the device, which is a sector frame 26 carrying the wires 27 functioning as cutters and this sector is approximately one-third of a complete circle so as to be accommodated in a sectional receptacle, pan or other utensil which sections are of a shape corresponding to the frame 26. The frame 26 is hinged at 28 for swinging movement at right angles to or in alignment with a bail 29, which centrally thereof has pivoted at 30 a latching member 31, its latching end 32 being engageable with the frame 26 for holding it at right angles to the bail 29. This member 31 when released from the frame 26 can be swung in matching relation to the bail 29 and the frame 26 gravitates in alignment with said bail 29. This latter position of the frame 26 enables the device after the cutting operation to be removed from a receptacle, pan or the like without drawing or lifting the vegetable content therefrom after the cutting operation for the cutting of the said content in the use of the device.

In Figures 3 and 5 of the drawing there is illustrated only suggested methods for the fastening of the wires to the frame and of course it is to be understood that any other method which might seem fitting and practical may be resorted to without departing from the spirit of the invention and sacrificing any of its advantages. Furthermore, changes, variations and modifications may be resorted to in the constructing of the invention in its entirety as fall properly within the scope of the appended claims.

What is claimed is:

1. A device of the character described comprising a pair of matched open frames having crossed wires arranged therein, a bail common to both frames and hinging the same in matched relation to each other, and means associated with the bail for latching the frames in the same plane with each other at substantially right angles to the bail.

2. A device of the character described comprising a pair of matched open frames having crossed wires arranged therein, a bail common to both frames and hinging the same in matched relation to each other, means associated with the bail for latching the frames in the same plane with each other at substantially right angles to the bail, and means pivotally connecting the last-named means with the bail.

3. A device of the character described comprinsing a pair of matched open frames having crossed wires arranged therein, a bail common to both frames and hinging the same in matched relation to each other, means associated with the bail for latching the frames in the same plane with each other at substantially right angles to the bail, means pivotally connecting the last-named means with the bail, and latching terminals formed on the first-named means and engageable with the frames when in the same plane with each other.

4. A device of the character described comprising a pair of matched open frames having crossed wires arranged therein, a bail common to both frames and hinging the same in matched relation to each other, means associated with the bail for latching the frames in the same plane with each other at substantially right angles to the bail, means pivotally connecting the last-named means with the bail, latching terminals formed on the first-named means and engageable with the frames when in the same plane with each other, and an eye associated with the pivot means.

5. A device of the character described, comprising a pair of matched semicircular open frames having cross wires arranged therein, a bail common to both frames and hinging the radial sides to each other, means associated with the bail and engaging the periphery of the frames for latching the same in the same plane with each other at substantially right angles to the bail, and means for pivotally connecting the latching means with the bail.

FLORENCE L. EHLKE.